Nov. 16, 1954   L. S. MEYER   2,694,661
PROCESS FOR FORMING ADHESIVE-EMBEDDED FIBER RODS
Filed Feb. 12, 1952   4 Sheets-Sheet 1
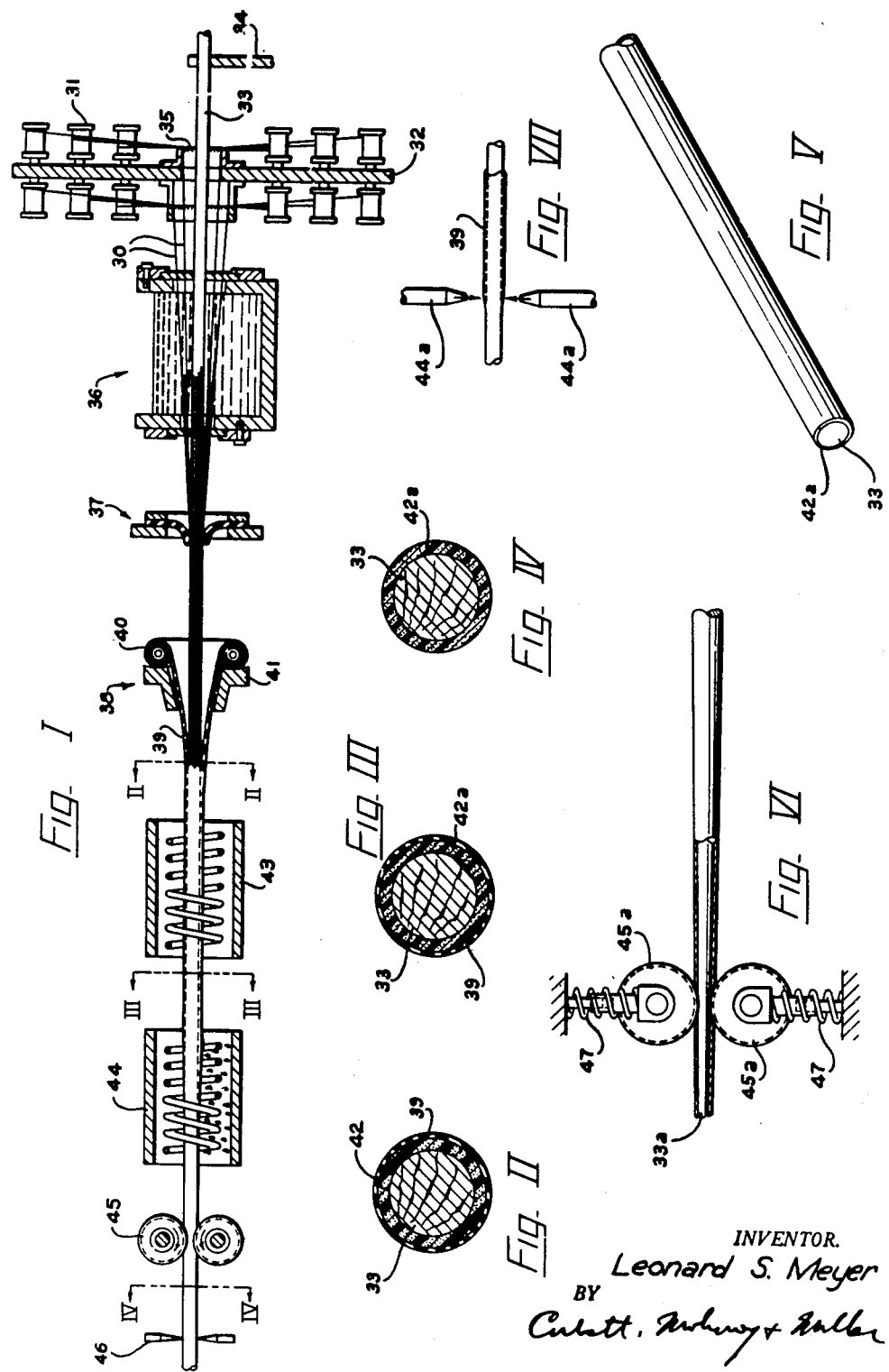
INVENTOR.
Leonard S. Meyer
BY Nov. 16, 1954     L. S. MEYER     2,694,661
PROCESS FOR FORMING ADHESIVE-EMBEDDED FIBER RODS
Filed Feb. 12, 1952     4 Sheets-Sheet 2
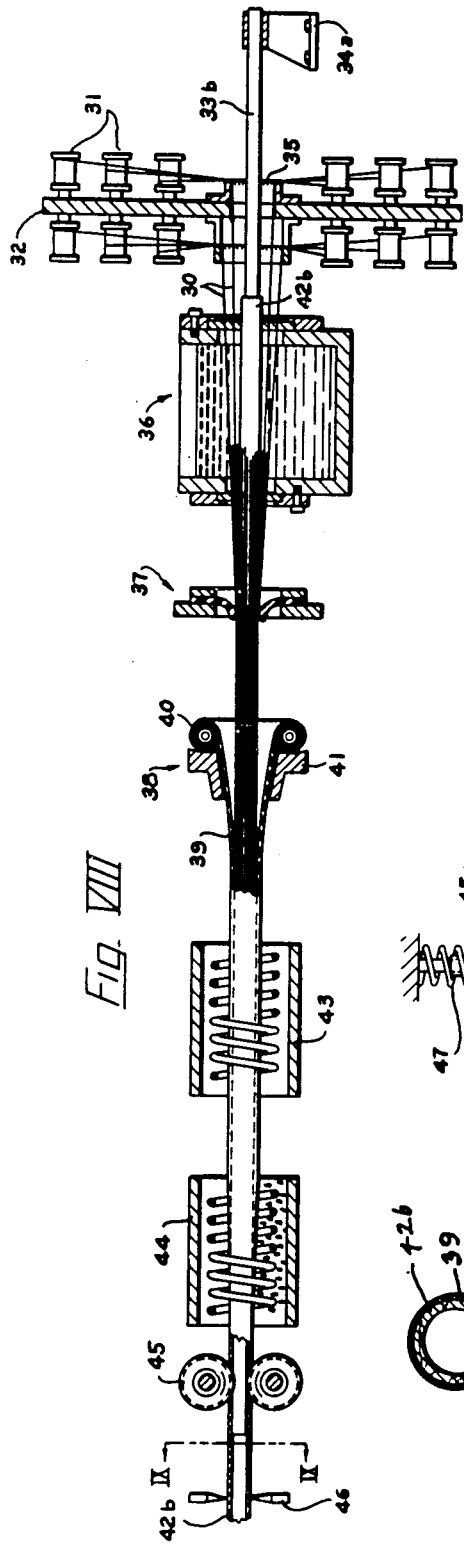
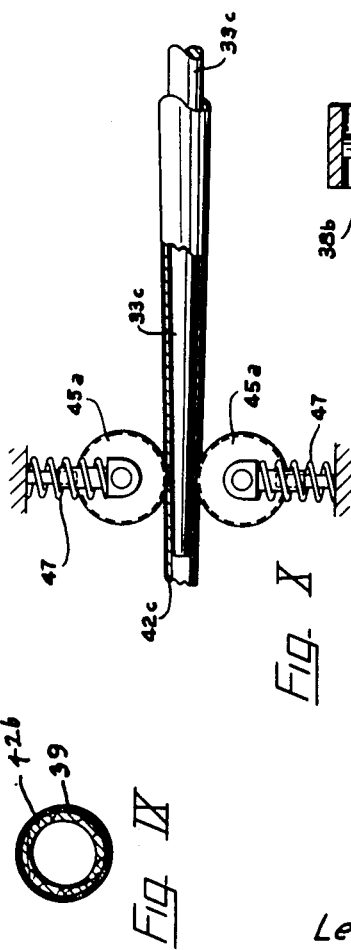
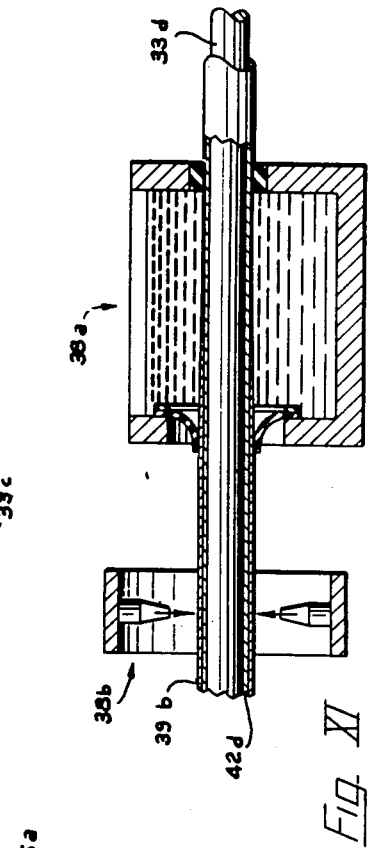
INVENTOR.
Leonard S. Meyer
BY

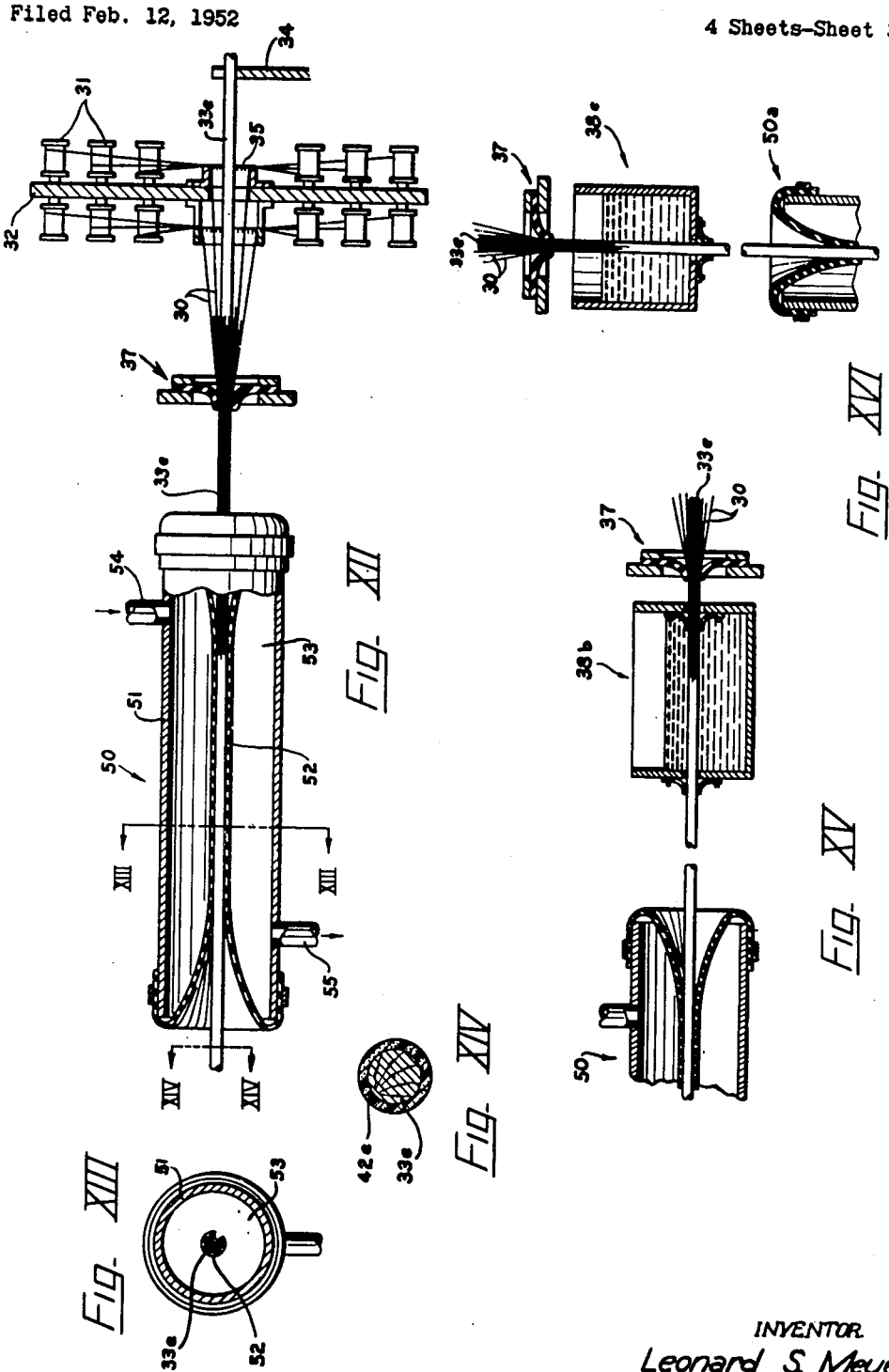

Nov. 16, 1954
L. S. MEYER
2,694,661
PROCESS FOR FORMING ADHESIVE-EMBEDDED FIBER RODS
Filed Feb. 12, 1952
4 Sheets-Sheet 4
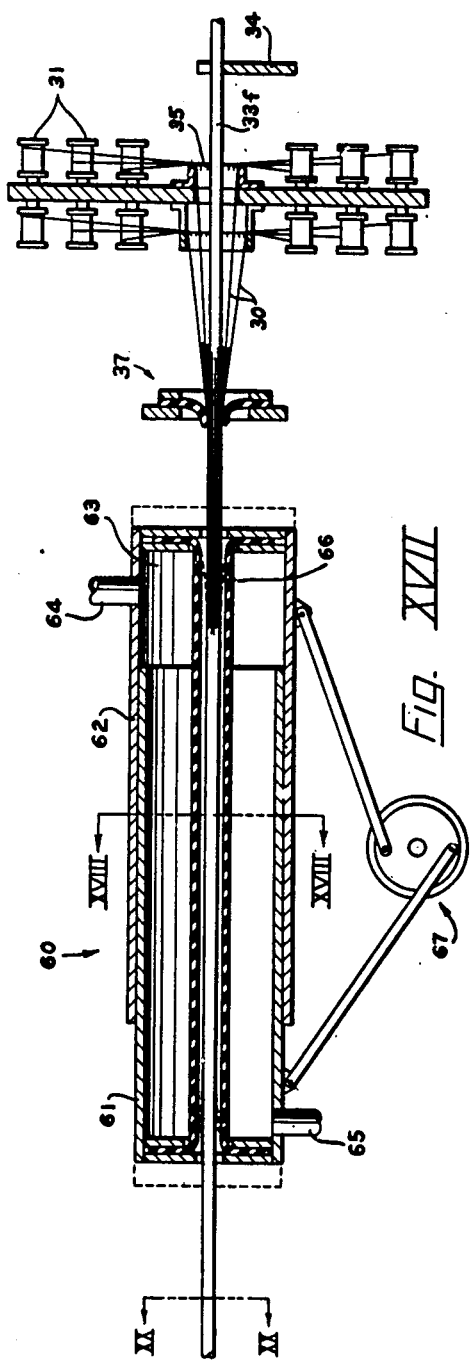
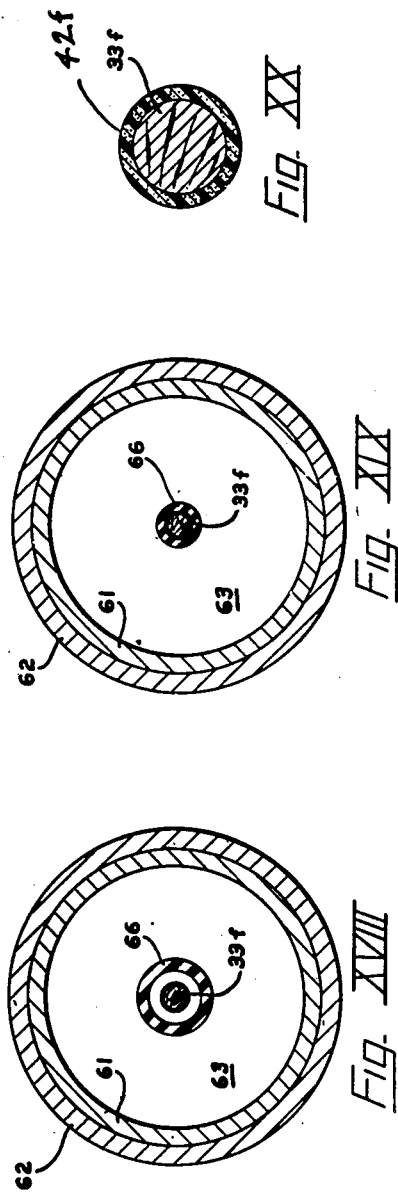
INVENTOR.
Leonard S. Meyer
BY

United States Patent Office 2,694,661
Patented Nov. 16, 1954

2,694,661

PROCESS FOR FORMING ADHESIVE-EMBEDDED FIBER RODS

Leonard S. Meyer, Newark, Ohio, assignor to Parallel Plastics Co., Newark, N. J., a partnership consisting of Leonard S. Meyer and George A. Shira Application February 12, 1952, Serial No. 271,184

18 Claims. (Cl. 154—91)

My invention relates to a process for forming adhesive-embedded fiber rods. It has to do, more particularly, with the forming of solid or hollow rods or tubes, straight or tapered, which includes an outer skin or wall of glass fibers which are embedded in a resin.

In the patent issued to Arthur M. Howald and Leonard S. Meyer on October 16, 1951, No. 2,571,717, there is disclosed a continuous process for forming rods of adhesive-embedded fibers. The rods are made by covering a core material with a skin of longitudinally extending high tensile strength filaments or fibers embedded in a matrix of a hard adhesive. According to such patent, the core material may be of any light wood, hardened foamed resin, or any similar light-weight material which is strong in compression. The fibers in the skin are preferably high tensile strength glass fibers embedded in the hard adhesive, which bonds to the glass fiber material and to the core material. A polymerizable unsaturated polyester or a diallyl ester may be used as the hardenable adhesive. Resins of this type and which have been found satisfactory as binders for glass fibers are disclosed in U. S. Patents Nos. 2,462,042 to Arthur M. Howald et al; 2,255,313 to Ellis; and 2,388,319 to Fuller.

In manufacturing the rods according to such patent, the filaments or fibers are coated with the adhesive and are stretched longitudinally as they are placed in juxtaposed position and are held in a bundle surrounding the surface of the core material while the adhesive hardens. The adhesive-coated filaments are arranged in a uniform layer if the rod is to have uniform strength in all directions and are arranged non-uniformly if the rod is to have various strengths in different directions. Immediately after the bundling operation, a binding tape is helically wound onto the surface of the skin enclosing the core material in order to hold the filaments and adhesive in place during the hardening or setting of the adhesive. This binding tape is usually of material which will not adhere to the resin and can, therefore, be stripped therefrom or is of such a nature that it can remain permanently on the rod. When removed from the rod, the tape leaves a helical ridge, where the resin seeps between the edges of the convolutions, or if the tape stays in place, the binding tape itself provides a rough surface. For some purposes the rough surface on the rod is not objectionable but for other purposes, for example, for use in making arrows to be shot from a bow, the rough surface makes the rod useless for that purpose.

It is, therefore, the main object of this invention to provide a process for forming solid or hollow rods with an outer skin or wall of longitudinally extending high tensile strength fibers embedded in a matrix of hard adhesive and whereby the resulting rods have absolutely smooth surfaces which makes them suitable for many purposes for which the prior art rods of the same general type were not suitable due to their rough surfaces.

In the accompanying drawings I have illustrated how my method can be performed. In these drawings:

Figure I is a diagrammatic view illustrating how a rod may be formed continuously, the smooth surface being produced on the rod by enclosing it before the adhesive is hardened in a molding or embracing tube, the material of which is removed after the adhesive is hardened.

Figure II is a transverse section taken on line II—II of Figure I showing the rod just after it is enclosed within the molding or embracing tube.

Figure III is a similar section taken on the line III—III of Figure I showing the tube after the adhesive is hardened but before the molding or embracing tube material is removed.

Figure IV is another similar section taken on line IV—IV of Figure I showing the completed rod and after the molding or embracing tube material has been removed.

Figure V is a perspective view of a short length of the completed rod.

Figure VI is a longitudinal sectional view showing how the core used in the method illustrated in Figure I can be tapered instead of straight.

Figure VII is a diagrammatic view illustrating another way of removing the material of the molding or embracing tube.

Figure VIII is a view similar to Figure I but illustrating a mandrel instead of a core so that a hollow rod or tube can be formed instead of a solid rod.

Figure IX is a transverse section taken on line IX—IX of Figure VIII showing the completed tube.

Figure X is a longitudinal sectional view showing how a tapered mandrel can be used instead of the straight mandrel of Figure VIII.

Figure XI is a longitudinal sectional view illustrating how a coating may be applied to the rod before curing instead of the molding and embracing tube as in Figure I.

Figure XII is a view mainly in longitudinal section illustrating a modification of the method for forming the smooth surface on the rod, the molding or embracing means, in this instance being a permanent mold with a flexible tubular mold cavity.

Figure XIII is a transverse section taken on line XIII—XIII of Figure XII showing the rod in the mold.

Figure XIV is a transverse section taken on line XIV—XIV of Figure XII showing the completed rod.

Figure XV is a view similar to Figure XII but showing an adhesive bath through which the fibers pass before molding.

Figure XVI is a view like Figure XV but showing the apparatus vertical instead of horizontal.

Figure XVII is a longitudinal sectional view illustrating a different type of mold with a flexible tube cavity for producing the smooth surface on the rod.

Figure XVIII is a transverse sectional view taken on line XVIII—XVIII of Figure XVII showing the rod in the mold cavity before the wall thereof embraces it.

Figure XIX is a view similar to Figure XVIII but showing the mold cavity embracing the rod.

Figure XX is a transverse section taken on line XX—XX of Figure XIX showing the completed rod.

In the following description I shall refer to the fibers as being glass fibers and the adhesive as being a resin but, as previously indicated, other materials may be used.

With reference to the drawings, in Figure I, I have illustrated one method of making a rod according to my invention. By this method long rods can be formed in a substantially continuous process. This method involves bundling a plurality of high-tensile strength glass fibers on a core of suitable compressive strength.

As shown, a plurality of the glass fibers 30 are continuously drawn from the bobbins 31 which are carried on the bobbin plate 32. At the same time the core 33 is fed continuously over a suitable support 34. The glass fibers are drawn under tension through circular combs 35, at the center of the bobbin plate 32, and the core 33 is also drawn through the center of these combs. The glass fibers may have been impregnated with or coated with uncured resin previously or the fibers may be passed through a bath of uncured resin illustrated at 36. The glass fibers 30 and the associated core 33 are drawn into the bundling ring 37 where the fibers are guided into close contact with and around the core 33 covering it with a layer of the uncured resin and glass fibers. This layer may have the fibers uniformly arranged around it, resulting from the uniform guiding arrangement provided by combs 35, or the fibers may be arranged non-uniformly around the layer if it is desired to have more tensional strength on one side or the other of the rod.

After leaving the bundling ring 37 and before the resin is cured, the core 33 with the layer of resin and fibers thereon is then drawn into a ring unit 38 which will apply a molding or embracing film tube 39. The film tube 39 is preferably in the form of an annular roll 40 which unwinds at its center and through which the core 33 and surrounding layer are drawn. This roll 40 of material bears against a cradle formed in the rear side of a flange 41 which is part of the ring unit 38. The ring unit 38 includes the funnel-shaped part which is directed forwardly and which serves to guide the fiber around the resin-fiber layer on the core 33. The film tube 39 is formed of resilient material and will be stretched, when pulled along by the core and surrounding resin-fiber layer, as it is unwound from the roll 40. In stretching, it is reduced in diameter and will tightly embrace the resin-fiber layer forming a smooth surface thereon. In starting the operation the forward or leading edge of the film tube may be suitably clamped or cemented to the resin fiber layer so that it will be pulled along by forward movement of the core 33 which is surrounded by the resin layer.

The film tube 39 is of special resilient material which will shrink and more tightly grip the resin-fiber layer when heated during the resin-curing operation, for example, at a temperature of between 150° and 200° F. and which can be disintegrated by further heat, for example, at about 375° F. I have found that a vinylidene chloride plasticized material is suitable for this purpose. Such a material is sold by the Dow Chemical Company under the trade-name "Saran."

When the enclosed core leaves the unit 38 it will appear in cross-section as in Figure II. The core 33 will be surrounded by the layer 42 of uncured resin and fibers and this layer will be surrounded by and tightly gripped by the film tube 39. The enclosed core is continuously and progressively drawn through the heating and curing unit 43 where the temperature is raised sufficiently, about 200° F., to cure the resin. As the resin is heated for curing, the film 39 is heated which, as indicated above, causes it to shrink and more tightly embrace the resin-fiber layer 42. Consequently, by the time the resin is cured the layer 42 is so tightly gripped that the cured layer 42a (Figure III) will have a smooth outer surface.

The formed rod, enclosed by film 39, is continuously and progressively drawn through the film-disintegrating unit 44. In this unit, the rod is heated to a temperature of about 375° F. The resin used in layer 42a is preferably a thermosetting resin so that this heat will not harm the layer but it will be sufficient to cause disintegration of film 39. This film material will melt and form globules which will drop off the rod onto the bottom of unit 44 and can be removed therefrom in any suitable manner.

The finished rod thus formed is shown in Figures IV and V and consists of the core 33 surrounded by the cured resin-fiber layer 42a which will have a smooth outer surface.

Beyond the unit 44, the gripping channel rollers 45 are provided which serve to pull the enclosed core progressively and continuously through all the various units. It is understood that these rollers will be driven positively by some suitable means. Beyond the rollers 45, a suitable severing unit may be provided for dividing the rod into suitable lengths, for example, shears 46 may be provided for acting on the rod while it is moving.

The core 33 is illustrated as circular in cross-section in Figure I but it is to be understood that it could be of any desired cross-sectional shape. The film tube 39 will tightly embrace it regardless of its cross-sectional shape. The pull-through rollers 45 will have channels of complemental shape.

For some uses it is desirable to have the rods taper. If so, the core 33 will have the desired taper. Instead of a straight core as in Figure I, the core may be made up of several succeeding tapered sections. As shown in Figure VI, the tapered core 33a will be fed with its small end leading. The tapered rod may be pulled by means of the gripping rollers 45a which are urged towards each other by springs 47 so as to compensate for the gradual increase in diameter of the rod. It will be understood that the channels in the rollers 45a will be of sufficient cross-sectional area to compensate also for the increase in diameter of the rod.

Instead of using the heating unit 44 of Figure I to disintegrate the film 39 it may be disintegrated by subjecting it instantaneously to a flame. This is illustrated diagrammatically in Figure VII where the jets 44a are provided for projecting flames on the film 39. If desired, the jets may be arranged in a circular burner through which the rod will pass.

In the arrangement shown in Figure I, the core 33 remains in the rod, forming a solid structure. However, my invention is also applicable to the forming of a hollow rod or tube as shown in Figures VIII and X.

In this form of my invention instead of providing the progressively fed core 33, which becomes a part of the rod, I provide the stationary mandrel 33b. The mandrel 33b is shown as a straight mandrel and is clamped in fixed position by a supporting clamp 34a at its rear end. The tube 42b is forced off the mandrel by means of the gripping rollers like the rollers 45 of Figure I which serve to support the forward end of the mandrel as well as to pull the resin-fiber layer or tube through the various units. Instead of forming the tube 42b, a hollow rod of any other desired cross-sectional shape may be formed, the pull-through rollers being changed to have channels of proper cross-section for receiving and gripping the particular shape. Application of the film 39 will be the same as in Figure I and it will be understood that it will stretch sufficiently as the tube 42b feeds progressively to compensate for the increase in diameter of the tube.

As shown in Figure X, instead of the mandrel being straight as in Figure VIII it may be tapered. The tapered mandrel 33c will have its small end forwardmost and the mandrel will be supported as in Figure VIII. However, the pull-through rollers will, in this instance, be yieldingly urged towards each other as in Figure VI so that they will spread apart as the tapering tube 42c is pulled off the mandrel and its diameter increases.

Instead of applying a film tube 39 to the rod, as in Figure I, the rod may be actually coated with a suitable substance which will serve to impart a smooth surface thereto during curing and will later be removed. Thus, as shown in Figure XI, instead of the unit 38, a liquid bath 38a is provided so that the resin-fiber layer will pass therethrough before the curing operation.

The liquid in the bath 38a will be a film-forming liquid which is immiscible with the particular resin being used and which will shrink when it dries. To dry it immediately after application and before the curing operation, I will provide a drying unit 38b for heating it to about 150° F., so that a dry film 39b will be formed thereon. Therefore, when the film 39b dries it will shrink and before the coated resin-fiber layer is cured, it will be tightly embraced thereby. The resin-fiber layer will be applied to a core 33d or to a permanent mandrel. Later the film 39b may be disintegrated by heating to a high temperature, for example, 375° F. or it may be stripped from the rod leaving the finished rod 42d.

Two solutions which are suitable for this film-forming purpose are solutions of methyl cellulose or polyvinyl alcohol for use with resins such as polyester or epoxy. Other solutions such as ethyl cellulose, nitro cellulose, cellulose acetate and vinylidene chloride may be used with resins such as urea formaldehyde and resorcinol formaldehyde.

The liquid in the bath 38a, moreover, could be a hot film-forming melt which would be immiscible with the resin being used in forming the rod. This melt would cool quickly immediately after it left the bath or could be cooled by a suitable cooling unit used in place of unit 38b. For example, various melts such as waxes, liquid thermoplastics, and vinyl plastisols could be used with various resins, such as polyester or urea formaldehyde. Films formed from these hot melts could also be removed after the curing operation either by heating to a temperature substantially exceeding the curing temperature of the resin, for example, about 375° F. or by stripping.

In Figure XII, I have illustrated a different way of forming a smooth surface on the resin-fiber layer of the rod. In this case the resin-fiber layer, formed from previously impregnated or coated fibers, on a core or a permanent mandrel is passed through a mold having a mold-cavity formed of a flexible wall which will be caused to tightly embrace the resin-fiber layer to form the smooth outer surface thereon.

Thus, the molding unit 50 includes the tubular casing 51 having a mold cavity formed therein by means of a flexible sleeve disposed thereon with its ends suitably clamped to the ends of casing 51. The sleeve 52 may be of rubber or other flexible material and is of such size that there is a fluid chamber 53 surrounding it in the casing 51. A suitable inlet 54 and outlet 55 are provided for this chamber 53.

In Figure XII, I have shown the resin-fiber layer applied to a core 33e but it is to be understood that this could be a mandrel. In initially starting the rod through this mold 50, the cavity thereof may be enlarged by vacuuming chamber 53, thus permitting the rod to enter thereinto freely. Then pressure, for example, steam, can be applied in chamber 53 and cause the tube 52 to tightly embrace the rod (Figure XIII) to form the smooth outer surface on the resin-fiber layer as the surrounded core is forced therethrough. If steam is used in chamber 53, this will also serve to cure the resin. The rod, thus formed, will appear in cross-section as in Figure XLV and will include core 33e and the cured resin-fiber layer 42e.

In Figure XV, I illustrate the use of the same mold 50 but the glass fibers are combined in a bath 38b of resin instead of being previously impregnated or coated with resin as in Figure XII.

In Figure XVI, the same arrangement of mold 50a is provided except that it is vertical. Also, the resin bath 38c is vertical.

It will be apparent that when the process is carried out as in Figures XII to XVI it can be continuous if the resin-fiber enclosed core or mandrel is passed through the mold 50 continuously after it is once started. On the other hand, the process could be intermittent, forming a length of the rod in mold 50 and then relieving the pressure to permit the mold cavity to enlarge so that the formed rod section can be received and a new section be placed in the mold 50.

In this form of my process also the rods formed can be of any cross-sectional shape depending on the shape of the mold cavity.

In Figure XVII, I have illustrated another type of mold 60 which may be used in carrying out my process continuously or intermittently.

The casing of this mold is formed by the telescoping sections 61 and 62 and provides an interior fluid chamber 63 that is provided with an inlet 64 and an outlet 65 to permit steam or other suitable fluid to pass through chamber 63. Centrally within chamber 63 a tube 66 of flexible material, such as rubber, is provided and one end is clamped to section 61 while the other end is clamped to section 62. A suitable unit 67 is provided for expanding and contracting the telescoping sections 61 and 62, the unit shown being mechanical. When the sections 61 and 62 are expanded the material of tube 66 is stretched and, therefore, it will become smaller in diameter and when the sections are again telescoped, the tube will become larger again in diameter.

The tube 66 will be in the enlarged state (Figure XVIII) when the core or mandrel 33f, with the resin-fiber layer thereon, is initially fed into mold 50 and then is contracted, with the surrounded core being subsequently fed therethrough continuously. The resin-fiber layer will at this time (Figure XIX) be tightly embraced by the tube 66. This will produce a rod 42f which (Figure XX) will have a resin-fiber layer with a smooth outer surface, the layer surrounding a core 33f.

The process can be intermittent also, the mold 60 acting successively on sections of the resin-fiber enclosed core.

It will be apparent from the above that I have provided a process of forming hollow or solid rods with an outer skin or wall of longitudinally extending high tensile strength fibers embedded in a matrix of hard adhesive, the process being such that the outer surfaces of the rods produced will have a very smooth surface with the result that the rods will be suitable for various purposes for which prior art rods could not be used because of their rough surfaces.

Having thus described my invention, what I claim is:

1. The method of forming a rod which comprises continuously and progressively combining a plurality of longitudinally extending fibers and an adhesive material capable of being hardened into an elongated rod-like mass and enclosing the rod-like mass within an elongated embracing molding material having a smooth continuous molding surface contacting the rod-like mass capable of being disintegrated by heat so that when the adhesive does harden there will be a smooth continuous surface free of ridges, treating the rod-like mass to harden the adhesive, and heating the enclosed rod-like mass to disintegrate the molding material.

2. The method of claim 1 wherein the longitudinally extending fibers are glass fibers which are maintained under tension and the adhesive is an uncured resin, and wherein said resin is heated to cure it after the molding material is applied thereto but before the material is heated for disintegration.

3. The method of claim 2 wherein the said fibers and resin are combined on a longitudinally extending support.

4. The method of claim 3 wherein the molding material is a longitudinally extending hollow member formed of vinylidene plasticized material.

5. The method of forming a rod which comprises combining a plurality of longitudinally extending fibers and an adhesive material capable of being hardened into an elongated rod-like mass, passing the rod-like mass into an elongated mold having a flexible wall cavity having a smooth continuous molding wall surface which is expanded into embracing relationship with the rod-like mass before the adhesive hardens so that when it does harden there will be a smooth continuous surface free of ridges produced on the resulting rod, treating the rod-like mass to harden the adhesive while embraced in the mold, and removing the resulting rod from the mold.

6. The method of claim 5 wherein the rod-like mass is fed continuously through the mold.

7. The method of claim 5 wherein the adhesive is in the form of a resin which is applied to the fibers that are glass by passing the fibers downwardly through a bath of the resin before the mass enters into the mold, the wall of the mold being heated to cure the resin while the rod-like mass is therein.

8. The method of claim 7 wherein a support in the form of a rod is also passed continuously downwardly through the bath of resin and then into the mold.

9. The method of forming a rod which comprises combining a plurality of longitudinally extending fibers and an adhesive capable of being hardened into an elongated rod-like mass, passing the rod-like mass into an elongated mold having a flexible wall cavity having a smooth continuous molding wall surface, causing the wall surface to embrace the rod-like mass before the adhesive hardens so that when it does harden there will be a smooth continuous surface free of ridges produced on the resulting rod, treating the rod-like mass to harden the adhesive while embraced in the mold and removing the resulting rod from the mold.

10. The method of forming a rod which comprises continuously and progressively combining a plurality of longitudinally extending glass fibers which are maintained under tension and an adhesive uncured resin capable of being hardened into an elongated rod-like mass on a longitudinally extending support and enclosing the rod-like mass within an elongated embracing molding material having a smooth continuous molding surface contacting the rod-like mass and being in the form of a longitudinally extending hollow member of vinylidene plasticized material capable of being disintegrated by heat so that when the adhesive does harden there will be a smooth continuous surface on the rod-like mass, heating the rod-like mass to cure the resin after the molding material is applied thereto but before such material is heated for disintegration, and heating the enclosed rod-like mass to disintegrate the molding material by subjecting said hollow member to a flame instantaneously.

11. The method of forming a rod which comprises combining a plurality of longitudinally extending fibers and an adhesive material capable of being hardened into an elongated rod-like mass, passing the rod-like mass into an elongated mold having a flexible wall cavity with a smooth continuous molding wall surface, enlarging the mold cavity to permit entrance of the rod-like mass in the initial movement of the mass thereinto and subsequently decreasing the mold cavity in size by expanding it into embracing relationship with the rod-like mass before the adhesive hardens to tightly grip the mass after the feed thereof into the mold has begun so that when the adhesive does harden there will be a smooth continuous surface produced on the resulting rod, heating the rod-like mass to harden the adhesive while embraced in the mold, and removing the resulting rod from the mold.

12. The method of claim 11 wherein the fibers are of glass and the adhesive is an uncured resin, the wall of the mold being heated to cure the resin while the rod-like mass is therein.

13. The method of claim 12 wherein the fibers are impregnated with the resin before combining by passing them through a resin bath continuously as they are combined.

14. The method of claim 13 wherein the fibers are combined upon a longitudinally extending support.

15. The method of claim 14 wherein the core material and fibers are passed downwardly through a bath of the resin and then into the mold which is vertically disposed.

16. The method of forming a rod which comprises combining a plurality of longitudinally extending fibers and an adhesive material capable of being hardened into an elongated rod-like mass, enclosing the rod-like mass within an embracing material having a smooth continuous surface contacting the rod-like mass by applying, before the adhesive hardens, an actual coating which does not combine with the adhesive of the rod so that when the adhesive does harden, there will be a smooth continuous surface produced on the resulting rod, treating the rod-like mass to harden the adhesive and removing the embracing material coating.

17. The method of claim 16 wherein the coating is applied by passing the rod-like mass through a liquid of film-forming substance which is immiscible with the adhesive.

18. The method of claim 17 wherein the liquid is a hot melt.

References Cited in the file of this patent

UNITED STATES PATENTS

| Number | Name | Date |
|---|---|---|
| 2,407,549 | Gurwick | Sept. 10, 1946 |
| 2,485,967 | Harding | Oct. 25, 1949 |
| 2,511,421 | Werner | June 13, 1950 |
| 2,571,717 | Howald et al. | Oct. 16, 1951 |

OTHER REFERENCES

Modern Plastics, Resin bonded glass fiber fly-rod, February 1946, pages 124 and 125.